US012072864B2

(12) United States Patent
Newburn

(10) Patent No.: US 12,072,864 B2
(45) Date of Patent: Aug. 27, 2024

(54) DIGITAL INFORMATION MANAGEMENT SYSTEM, METHOD, AND DEVICE

(71) Applicant: Connoisseur Technology Holdings, LLC, Denver, CO (US)

(72) Inventor: Ryan Newburn, Cenennial, CO (US)

(73) Assignee: Connoisseur Applications, LLC, Denver, CO (US)

( * ) Notice: Subject to any disclaimer, the term of this patent is extended or adjusted under 35 U.S.C. 154(b) by 0 days.

(21) Appl. No.: 18/327,320

(22) Filed: Jun. 1, 2023

(65) Prior Publication Data

US 2023/0394025 A1  Dec. 7, 2023

Related U.S. Application Data

(60) Provisional application No. 63/348,124, filed on Jun. 2, 2022.

(51) Int. Cl.
  *G06F 16/22*    (2019.01)
  *H04L 65/1069*  (2022.01)

(52) U.S. Cl.
  CPC ...... *G06F 16/2291* (2019.01); *H04L 65/1069* (2013.01)

(58) Field of Classification Search
  None
  See application file for complete search history.

(56) References Cited

U.S. PATENT DOCUMENTS

| | | | |
|---|---|---|---|
| 6,697,328 B1* | 2/2004 | Briem | H04L 49/3081 370/414 |
| 8,949,278 B2* | 2/2015 | Ulm | G06F 16/20 707/802 |
| 9,204,088 B2* | 12/2015 | Parent | H04M 3/42391 |
| 9,620,104 B2* | 4/2017 | Naik | G10L 13/027 |
| 9,646,329 B2* | 5/2017 | Romes | G06Q 10/10 |
| 10,146,830 B2* | 12/2018 | van Os | G06F 16/244 |
| 10,298,685 B1* | 5/2019 | Amansahedov | H04M 1/2757 |
| 10,387,539 B2* | 8/2019 | Scapa | G06F 40/103 |
| 10,397,147 B2* | 8/2019 | Li | H04W 4/12 |
| 10,757,245 B2* | 8/2020 | Yu | G06F 3/0482 |
| 10,848,908 B2* | 11/2020 | Cohen | H04W 76/10 |
| 11,017,438 B2* | 5/2021 | Willardsen | G06Q 30/0277 |
| 11,032,390 B2* | 6/2021 | Scapa | H04L 67/10 |
| 11,336,701 B2* | 5/2022 | Shelke | H04L 65/1093 |
| 2004/0267625 A1* | 12/2004 | Feng | G06Q 10/10 715/733 |

(Continued)

*Primary Examiner* — Backhean Tiv
(74) *Attorney, Agent, or Firm* — Jedediah Knight

(57) ABSTRACT

A digital information management system allows users to share contact information with specific contact groups. The system comprises a communications network, a first computing device with a first user interface, a first processor, and a first memory, and a second computing device with a second user interface, a second processor, and a second memory. The second computing device receives two sets of user contact information with different contact type designations and generates contact card data for each set. The system then allows users to send the contact card data to the first computing device via the communications network, where it can be displayed on the first user interface. This system provides a convenient and efficient way for users to share contact information with specific groups.

14 Claims, 8 Drawing Sheets

(56) References Cited

U.S. PATENT DOCUMENTS

| | | | | |
|---|---|---|---|---|
| 2006/0023849 A1* | 2/2006 | Timmins | H04M 3/4936 | 379/88.19 |
| 2006/0075231 A1* | 4/2006 | Yu | G06Q 10/10 | 713/168 |
| 2006/0293903 A1* | 12/2006 | Ramanathan | G06Q 30/0277 | 709/206 |
| 2006/0293904 A1* | 12/2006 | Ramanathan | G06Q 10/00 | 709/206 |
| 2006/0293905 A1* | 12/2006 | Ramanathan | G06Q 10/10 | 709/206 |
| 2011/0173298 A1* | 7/2011 | Nam | G06Q 10/10 | 709/219 |
| 2012/0035992 A1* | 2/2012 | Tanaka | G06Q 30/0241 | 705/1.1 |
| 2012/0110464 A1* | 5/2012 | Chen | G06F 3/04817 | 715/738 |
| 2012/0203821 A1* | 8/2012 | Czajka | G06F 16/285 | 709/203 |
| 2013/0185322 A1* | 7/2013 | Vegh | G06Q 10/103 | 707/769 |
| 2014/0063175 A1* | 3/2014 | Jafry | H04L 65/1069 | 348/14.02 |
| 2014/0149518 A1* | 5/2014 | Zhao | H04L 51/48 | 709/206 |
| 2014/0267580 A1* | 9/2014 | Parent | H04N 7/141 | 348/14.12 |
| 2014/0282041 A1* | 9/2014 | Walker | G06F 3/0484 | 715/739 |
| 2014/0302838 A1* | 10/2014 | Na | H04M 1/2757 | 455/418 |
| 2014/0304260 A1* | 10/2014 | Ulm | G06Q 10/107 | 715/733 |
| 2014/0365469 A1* | 12/2014 | Daskal | G06F 16/273 | 707/740 |
| 2015/0100868 A1* | 4/2015 | Moore | G06F 40/134 | 715/205 |
| 2015/0242490 A1* | 8/2015 | Czajka | G06F 16/285 | 707/736 |
| 2015/0254578 A1* | 9/2015 | Chi | H04L 67/10 | 705/342 |
| 2015/0370905 A1* | 12/2015 | Leon | G06Q 50/01 | 707/722 |
| 2015/0379130 A1* | 12/2015 | Harik | G06Q 50/01 | 707/738 |
| 2017/0171140 A1* | 6/2017 | Somarriba | H04L 51/48 | |
| 2017/0364481 A1* | 12/2017 | Scapa | H04L 51/48 | |
| 2018/0060017 A1* | 3/2018 | Lauck | H04M 1/274 | |
| 2018/0139210 A1* | 5/2018 | Gideon, III | H04L 63/06 | |
| 2018/0190050 A1* | 7/2018 | Pinney | G06Q 10/107 | |
| 2019/0370312 A1* | 12/2019 | Scapa | H04L 51/48 | |
| 2020/0134567 A1* | 4/2020 | Mandelli | G06Q 10/109 | |
| 2020/0137010 A1* | 4/2020 | Marmash | G06F 3/0482 | |
| 2021/0256476 A1* | 8/2021 | Mpare | H04W 4/029 | |
| 2021/0312396 A1* | 10/2021 | Mueller | H04L 9/3239 | |
| 2023/0099324 A1* | 3/2023 | Wahl | G06F 3/04842 | 715/751 |

* cited by examiner

DIGITAL INFORMATION MANAGEMENT SYSTEM, METHOD, AND DEVICE

CROSS-REFERENCE TO RELATED APPLICATIONS

The present application claims priority to U.S. Provisional Patent Application No. 63/348,124 entitled "DIGITAL INFORMATION MANAGEMENT SYSTEM AND METHOD", filed on Jun. 2, 2022. The entire contents of the above-listed application are hereby incorporated by reference for all purposes.

BACKGROUND

The present disclosure relates generally to digital information management systems and methods. More specifically, it is concerned with a cross-platform system for electronically storing, sorting, grouping, updating, and accommodating efficient sharing of electronic information.

In this day and age, most people use numerous digital platforms on a regular basis, whether that be email, social media, Voice over Internet Protocol (VoIP) communications, digital payment systems, online gaming, entertainment streaming services, virtual communities, and/or other digital platforms. A person's virtual identity is commonly different across various digital platforms, with these differing platform accounts being unlinked to one another. For example, someone's username or "handle" on Twitter may be completely unrelated to his or her name on Facebook, which is further unrelated to his or her email address, phone number, etc. Such varied digital identities can become particularly problematic when a person wants to share his or her contact information and/or obtain contact information from another person.

When meeting someone new, it is often customary for the parties to exchange contact information, but such an exchange has become more complicated with the popularity and use of so many digital platforms. A person must decide not only what contact information to share but also how much time and effort he or she is willing or able to spend sharing digital contact information with another party. While it may be easy to send a quick text message or email to a new acquaintance, it can be quite burdensome to share contact information for every digital platform a person uses, one by one. Accordingly, it would be beneficial to have a digital contact information management system which would allow a user to aggregate all his or her digital contact information and to quickly and easily share that contact information.

Even if someone has all his or her digital contact information saved in one place, it can be difficult to filter through which of that digital contact information to provide to someone else. For instance, the digital contact information shared with a new business contact is likely different than the digital contact information shared with a new friend or a family member. Accordingly, it would be beneficial to have a digital contact information management system which would allow for quick and easy customization of what contact information to share. Moreover, it would be beneficial to have a digital contact information management system which accommodates saving commonly used groupings of digital contact information, such as a new business contact grouping of contact information, a new friend grouping of contact information, etc.

Further complicating things, certain digital contact information is difficult to exchange without an internet connection, and when an internet connection is not immediately accessible, it can be hard to remember to send such digital contact information at a later time. Accordingly, it would be beneficial to have a digital contact information management system capable of initiating contact information sharing offline for later download when connected to the internet.

Another common issue with current contact information systems is that they often lead to multiple saved contacts for the same individual. For example, when a contact changes his or her contact information or creates a new digital account with new contact information, a user of a standard contact information system typically inputs such updated or new contact information manually, which at times can result in the user inadvertently creating multiple contact entries for the same person. Such multiple contact entries become an issue later when the user wants to contact the person for whom there are multiple contact entries, and the user is uncertain which phone number, email address, etc. is the correct, up to date contact information for that person. Accordingly, it would be beneficial to have a digital contact information system which automatically updates a person's contact information systemwide when that person updates his or her contact information in the system.

Oftentimes it is difficult for someone to locate a contact's other digital contact information if only some of that contact's digital contact information is initially known, particularly if the contact has a common name or if his or her other digital contact information does not incorporate his or her name, such as a social media handle or gamertag. Accordingly, it would be beneficial to have a digital contact information system which accommodates efficient searching for a contact's other digital contact information on other digital platforms.

In most situations, particularly in business settings, once a person shares his or her contact information with another person, the sharing party does not know what the receiving party does with the sharing party's contact information. For example, a sharing party typically would not know if a receiving party later passed along the sharing party's contact information to a third party unless the receiving party specifically told the sharing party about it. In a sales or service industry, it would often be beneficial for a party to know when someone receives his or her contact information to better facilitate an initial sales or service conversation. Accordingly, it would be beneficial to have a digital contact information system which notifies a user when his or her contact information is provided to a new party.

With so many different digital platforms, it can be overwhelming to keep up with each of them. For instance, a person may have unread messages across several different digital platforms, multiple calendars, unseen postings made by friends and family members, etc. Accordingly, it would be beneficial to have a digital information management system which allows a user to conveniently aggregate digital information across many digital platforms in one place.

SUMMARY

A digital information management system may include a communications network, a first computing device, and a second computing device. The first computing device may include a first user interface, a first processor, and a first memory coupled to the first processor. The first memory may store instructions executable by the processor to connect to the communications network. The second computing device may include a second user interface, a second processor, and a second memory coupled to the second processor. The second memory may store instructions executable by the second processor to connect to the communications network. The instructions may be executable by the second processor to receive a first set of user contact information having a first contact type designation and receive a second set of user contact information having a second contact type designation. The instructions may be executable by the second processor to generate first contact card data that includes the first set of user contact information and generate second contact card data that includes the second set of user contact information.

The instructions may be executable by the second processor to receive a send input via the second user interface and, in response, to receiving the send input, determine whether the send input is associated with the first contact card data or the second contact card data. In response to the send input being associated with the first contact card data, the instructions may be executable by the second processor to transmit the first contact card data to the first computing device via the communications network. The first contact card data may be displayable by the first computing device via the first user interface. In response to the send input being associated with the second contact card data, the instructions may be executable by the second processor to transmit the second contact card data to the first computing device via the communications network. The second contact card data may be displayable by the first computing device via the first user interface.

The first set of user contact information may include one or more of: a first phone number, a first email address, a first physical address, and a first social media handle. The first contact type designation may indicate a first type of contact group with which the first set of user contact information is to be shared. The second set of user contact information may include one or more of: the first phone number or a second phone number, the first email address or a second email address, the first physical address or a second physical address, and the first social media handle or a second social media handle. The second contact type designation may indicate a second type of contact group with which the second set of user contact information is to be shared.

The first computing device may include a first global positioning system (GPS) coupled to one or more of the first processor and the first memory. The first memory may store instructions executable by the first processor to receive the first contact card data or the second contact card data, determine a date and time the first contact card data or the second contact card data is received, determine, by the first GPS, a location of the first computing device at the date and time the first contact card data or the second contact card data is received, and update the first contact card data or the second contact card data with the date, time, and location.

The second computing device may include a second GPS coupled to one or more of the second processor and the second memory. The second memory may store instructions executable by the second processor to, in response to receiving the send input, determine a date and time the send input is received, determine, by the first GPS, a location of the second computing device at the date and time the send input is received, and transmit the date, time, and location to the first computing device via the communications network.

The second memory may store instructions executable by the second processor to determine a connectivity between the second computing device and the communications network. In response to there being no connectivity, or in response to there being insufficient connectivity for transmitting the first or second contact card data, the date, the time, or the location, the instructions may be executable by the second processor to add the first or second contact card data, the date, the time, and the location to a queue in the second memory and periodically re-determine the connectivity until there is sufficient connectivity for transmitting the first or second contact card data, the date, the time, or the location.

The first memory may store instructions executable by the first processor to receive a first communication associated with the first set of contact information or the second set of contact information and determine a media type of the first communication. The media type may include at least one of a phone call, an email, an instant message, or a social media post. The instructions may be executable to receive a second communication associated with the first set of contact information or the second contact information and determine the media type of the second communication. The media type of the second communication is different from the media type of the first communication. The instructions may be executable to receive, via the first user interface, an order input for the first communication and the second communication. The order input may indicate an order of organizing the first communication and the second communication. The instructions may be executable to generate a feed of the first communication and the second communication, which feed may indicate the media type of the first communication and the media type of the second communication. The first communication and the second communication may be organized in the feed according to the order input. The instructions may be executable to display the feed via the first user interface.

The second memory may store instructions executable by the second processor to generate a voice over internet protocol (VoIP) display via the second user interface, receive a VoIP call via the communications network, and determine whether the VoIP call is associated with the first phone number or the second phone number. In response to the VoIP call being associated with the first phone number, the instructions may be executable to display, via the second user interface, a first indicator associated with the first phone number, where the first indicator indicates the VoIP call is associated with the first set of contact information. In response to the VoIP call being associated with the second phone number, the instructions may be executable to display, via the second user interface, a second indicator associated with the second phone number, where the second indicator indicates the VoIP call is associated with the second set of contact information.

The second memory may store instructions executable by the second processor to receive updated contact information and determine whether the updated contact information is associated with the first set of contact information or second set of contact information. In response to the updated contact information being associated with the first set of contact information, the instructions may be executable to update the first contact card data with the updated contact information. In response to the updated contact information being associated with the second set of contact information, the instructions may be executable to update the second contact card data with the updated contact information. In response to the updated contact information being associated with the first set of contact information and the first contact data being already transmitted to the first computing device, the instructions may be executable to transmit the updated contact information to the first computing device. In response to the updated contact information being associated with the second set of contact information and the second set of contact information being already transmitted to the first computing device, the instructions may be executable to transmit the updated contact information to the first computing device.

A method of managing digital information may include receiving, at a first computing device, a first set of user contact information having a first contact type designation and receiving, at the first computing device, a second set of user contact information having a second contact type designation. The method may include generating first contact card data that includes the first set of user contact information and generating second contact card data that includes the second set of user contact information. The method may include receiving a send input and, in response to receiving the send input, determining whether the send input is associated with the first contact card data or the second contact card data. In response to the send input being associated with the first contact card data, the first contact card data may be transmitted to a second computing device via a communications network. In response to the send input being associated with the second contact card data, the second contact card data may be transmitted to the second computing device via the communications network.

The first set of user contact information may include one or more of a first phone number, a first email address, a first physical address, and a first social media handle. The first contact type designation may indicate a first type of contact group with which the first set of user contact information is to be shared. The second set of user contact information includes one or more of the first phone number or a second phone number, the first email address or a second email address, the first physical address or a second physical address, and the first social media handle or a second social media handle. The second contact type designation may indicate a second type of contact group with which the second set of user contact information is to be shared.

The method may include receiving, at the second computing device, the first contact card data or the second contact card data and determining a date and time the first contact card data or the second contact card data is received at the second computing device. Using a global positioning system (GPS) of the second computing device, a location of the second computing device at the date and time the first contact card data or the second contact card data is received may be determined. The first contact card data or the second contact card data may be updated with the date, time, and location.

The method may include determining a date and time the send input is received and determining, by a GPS of the first computing device, a location of the first computing device at the date and time the send input is received. The date, time, and location may be transmitted to the second computing device via the communications network. A connectivity may be determined between the first computing device and the communications network. In response to there being no connectivity, or in response to there being insufficient connectivity for transmitting the first or second contact card data, the date, the time, or the location, the first or second contact card data, the date, the time, and the location may be added to a queue in a memory of the first computing device. The connectivity may be periodically re-determined until there is sufficient connectivity for transmitting the first or second contact card data, the date, the time, or the location.

The method may include receiving a first communication associated with the first set of contact information or the second set of contact information and determining a media type of the first communication. The media type may include at least one of a phone call, an email, an instant message, or a social media post. A second communication associated with the first set of contact information or the second set of contact information may be received. The method may include determining the media type of the second communication, where the media type of the second communication is different from the media type of the first communication. The method may include receiving organization data for the first communication and the second communication. The organization data may indicate an order of organizing the first communication and the second communication. A feed of the first communication and the second communication may be generated that indicates the media type of the first communication and the media type of the second communication. The first communication and the second communication may be organized in the feed according to the order input.

The method may include generating a voice over internet protocol (VoIP) display via a user interface of the first computing device, receiving a VoIP call via the communications network, and determining whether the VoIP call is associated with the first phone number or the second phone number. In response to the VoIP call being associated with the first phone number, the method may include displaying, via the user interface, a first indicator associated with the first phone number. The first indicator may indicate the VoIP call is associated with the first set of contact information. In response to the VoIP call being associated with the second phone number, the method may include displaying, via the user interface, a second indicator associated with the second phone number. The second indicator may indicate the VoIP call is associated with the second set of contact information.

The method may include receiving updated contact information and determining whether the updated contact information is associated with the first set of contact information or second set of contact information. In response to the updated contact information being associated with the first set of contact information, the first contact card data may be updated with the updated contact information. In response to the updated contact information being associated with the second set of contact information, the second contact card data may be updated with the updated contact information. The updated contact information may be transmitted to the first computing device in response to the updated contact information being associated with the first set of contact information and the first contact data being already transmitted to the second computing device. The updated contact information may be transmitted to the first computing device in response to the updated contact information being associated with the second set of contact information and the second set of contact information being already transmitted to the second computing device.

A device for managing digital contact information may include a first user interface; a processor; and a memory coupled to the processor. The memory may store instructions executable by the processor to connect to a communications network, receive a first set of user contact information having a first contact type designation, and receive a second set of user contact information having a second contact type designation. First contact card data may be generated, where the first contact card data includes the first set of user contact information. Second contact card data may be generated, where the second contact card data may include the second set of user contact information. The instructions may be executable to receive a send input via the user interface and, in response to receiving the send input, determine whether the send input is associated with the first contact card data or the second contact card data. In response to the send input being associated with the first contact card data, the first contact card data may be transmitted to a remote computing device via the communications network. In response to the send input being associated with the second contact card data, the second contact card data may be transmitted to the remote computing device via the communications network.

The first set of user contact information may include one or more of a first phone number, a first email address, a first physical address, and a first social media handle. The first contact type designation may indicate a first type of contact group with which the first set of user contact information is to be shared. The second set of user contact information may include one or more of the first phone number or a second phone number, the first email address or a second email address, the first physical address or a second physical address, and the first social media handle or a second social media handle. The second contact type designation may indicate a second type of contact group with which the second set of user contact information is to be shared.

A first global positioning system (GPS) may be coupled to one or more of the processor and the memory. The instructions may be executable by the processor to determine a date and time the send input is received and determine, by the first GPS, a location of the device at the date and time the send input is received. The date, time, and location may be transmitted to the second computing device via the communications network.

The memory may store instructions executable by the processor to determine a connectivity with the communications network. In response to there being no connectivity, or in response to there being insufficient connectivity for transmitting the first contact card data, the second contact card data, the date, the time, or the location, the instructions may be executable to add the first contact card data, the second contact card data, the date, the time, and the location to a queue in the memory. The instructions may be executable to periodically re-determine the connectivity until there is sufficient connectivity for transmitting the first contact card data, the second contact card data, the date, the time, or the location.

The memory may store instructions executable by the processor to receive a first communication associated with the first set of contact information or the second set of contact information and determine a media type of the first communication. The media type may include at least one of a phone call, an email, an instant message, or a social media post. The instructions may be executable to receive a second communication associated with the first set of contact information or the second contact information and determine the media type of the second communication. The media type of the second communication may be different from the media type of the first communication. The instructions may be executable to receive, via the user interface, an order input for the first communication and the second communication. The order input may indicate an order of organizing the first communication and the second communication. The instructions may be executable to generate a feed of the first communication and the second communication. The feed may indicate the media type of the first communication and the media type of the second communication. The first communication and the second communication may be organized in the feed according to the order input. The instructions may be executable to display the feed via the user interface.

The memory may store instructions executable by the processor to generate a voice over internet protocol (VoIP) display via the user interface, receive a VoIP call via the communications network, and determine whether the VoIP call is associated with the first phone number or the second phone number. In response to the VoIP call being associated with the first phone number, the instructions may be executable to display, via the user interface, a first indicator associated with the first phone number. The first indicator may indicate the VoIP call is associated with the first set of contact information. In response to the VoIP call being associated with the second phone number, the instructions may be executable to display, via the user interface, a second indicator associated with the second phone number. The second indicator may indicate the VoIP call is associated with the second set of contact information.

The memory may store instructions executable by the processor to receive updated contact information and determine whether the updated contact information is associated with the first set of contact information or second set of contact information. In response to the updated contact information being associated with the first set of contact information, the instructions may be executable to update the first contact card data with the updated contact information. In response to the updated contact information being associated with the second set of contact information, the instructions may be executable to update the second contact card data with the updated contact information. In response to the updated contact information being associated with the first set of contact information and the first contact data being already transmitted to the first computing device, the instructions may be executable to transmit the updated contact information to the first computing device. In response to the updated contact information being associated with the second set of contact information and the second set of contact information being already transmitted to the first computing device, the instructions may be executable to transmit the updated contact information to the first computing device.

BRIEF DESCRIPTION OF THE DRAWINGS

The present description will be understood more fully when viewed in conjunction with the accompanying drawings of various examples of a digital information management system, method, and device. The description is not meant to limit the digital information management system, method, and device to the specific examples. Rather, the specific examples depicted and described are provided for explanation and understanding of digital information management system, method, and device. Throughout the description the drawings may be referred to as drawings, figures, and/or FIGS.

DETAILED DESCRIPTION

Figure 1:
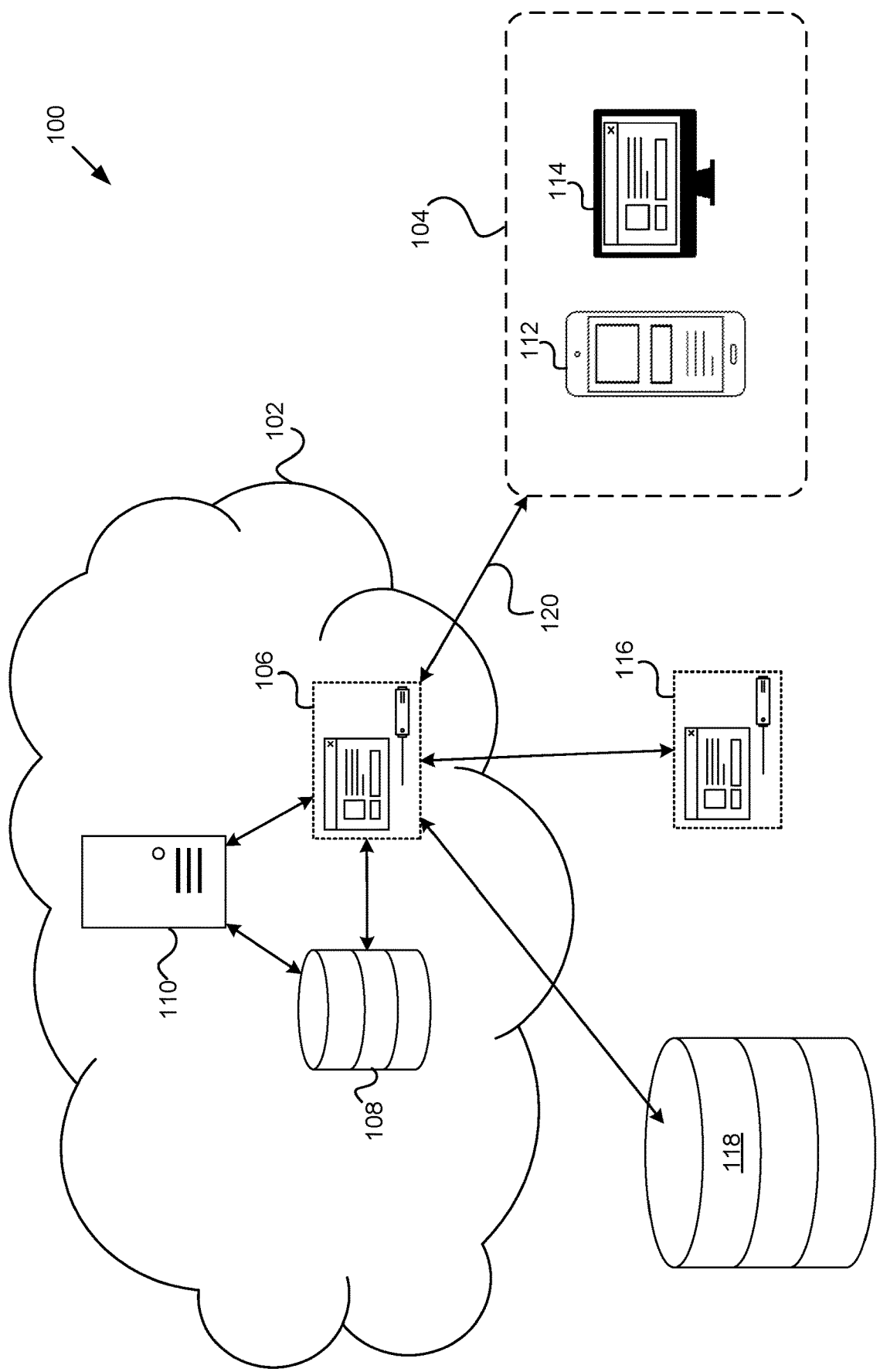
FIG. 1 illustrates a digital information management system, according to an implementation.

A digital information management system, method, and device as disclosed herein will become better understood through a review of the following detailed description in conjunction with the figures. The detailed description and figures provide merely examples of the various implementations of the digital information management system, method, and device. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

The digital information management system allows users to efficiently store, share, update, and control digital information, including but not limited to digital contact information. Various implementations further allow users to capture various types of digital information and dynamically search, sort, group, and interact with such digital information.

The system includes a central computing device having a processor and connected to a communications network, a database having a memory, remote computing devices each having a display and connected to the communications network, and a user interface accessible via a remote computing device display. The remote computing device may be a laptop computer, desktop computer, smart device such as a smartphone or tablet, or any other type of computing device capable of connecting to a communications network and having an associated display. The user interface may be a web interface, a mobile application, an online portal, or any other type of user interface accessible on a remote computing device over a communications network. The communications network may be wired or wireless internet connection, wired or wireless intranet connection, or any other type of communications network capable of connecting system components.

The system includes a digital contact information management system and method. The system further may integrate a global navigation satellite system (GNSS) or global positioning system (GPS) associated with one or more of the remote computing devices connected to the system. When a user opens the user interface on a remote computing device, the system may display a list and/or a map showing all other system users located within a certain range of the user's remote computing device and may accommodate safe and secure connection between system users for exchange of digital contact information. If a user is not in the same physical location as another system user, a user may be searched for by a unique username to enable a safe and secure connection for sharing of digital contact information. The digital contact information management system may further accommodate adding new digital contact information into a queue while offline for later upload when a network connection is established. Digital contact information in the queue may be stored locally on the remote computing device until a network connection is established and the digital contact information is uploaded to the system.

The system may further integrate with a camera of a remote computing device and is configured for reading a quick response (QR) code, barcode, or alternative scannable code to prompt receipt of another user's digital contact information. Scanning the QR code, barcode, or alternative scannable code may open a dialog box or alternative prompt asking a user if he or she wants to download the other user's contact information. Scanning of the code may automatically begin downloading the other user's contact information or adds the other user's contact information to a queue for later download. Such a digital contact information management system with scannable codes accommodates quick and easy exchanges of contact information. The system may include Bluetooth or other radio frequency functionality for connectivity between system remote computing devices and exchange of digital contact information.

The digital contact information management system may be configured to allow a user to create one or more digital contact information virtual cards via the system user interface. The system may be configured so that during initial setup of a user account, the system prompts the user to create at least one virtual contact card via the user interface with whichever digital contact information the user wants to include on the virtual card. The system may allow a user to create as many saved virtual contact cards as desired for commonly used groupings of contact information. Moreover, the system may also accommodate customization of individual virtual contact cards prior to sharing the virtual contact card with another person. So, a user may create an unlimited number of virtual contact cards to reflect any exchange of contact information scenario, such as a business contact card, a personal friend card, a recreational sports league team card, etc. When a user wants to share his or her contact information using the present system, the user may select from one of his or her previously created cards or create a new one on the spot.

The system may store a master data file for each user. This may help eliminate the issue of multiple contact entries for a single person. When a user updates his or her contact information within the system, the contact information may be updated for every person who has that contact information entry saved in the system. Such automatic updating helps to avoid a user having multiple saved phone numbers, email addresses, etc. for the same person and being unsure which is correct.

When a user receives contact information from another user, some additional pieces of information may be automatically captured: the geographic location of the user, the time, and the date when the contact information was received. Such location, time, and date information can help a user of the system to quickly recall information regarding the identity of or other information regarding the contact entry.

The system may further accommodate quick and easy creation and sorting of groups of contact entries or other digital information. The system may allow a user to create multiple groups of contact entries via the user interface to allow for efficient group messaging. For example, a user can have a business contact group, a family group, a friend group, a church contact group, an athletic team contact group, etc. The system can be searched, and groups created from those search results, based on certain digital contact information saved in individual contact entries, such as but not limited to contacts in a particular location or contacts with a particular type of social media account, etc. Moreover, contact groups can be created based on to whom a particular virtual contact card is shared by a user. For instance, contacts who received the Saturday morning tennis virtual contact card from the user can create a Saturday morning tennis contact group of that contact's own, either automatically or manually.

Users may share and receive groups of contact entries. A receiving party would receive the contact group having each individual member of the group's virtual contact card with digital contact information saved within it. This feature may be particularly useful when a new person joins an established group because it allows the new member to receive contact information for the rest of the group at once rather than having to enter contact information for each group member individually.

The digital information management system may include customizable notifications for when another user of the system shares one's contact information with a third-party user of the system. For example, a user can configure the present system to send the user a notification if another user sends the user's contact information to a potential business lead via the system. Such notifications of contact information being passed along to another party can help facilitate an introductory communication between parties. A record of shared contact information may be stored by the system and accessible via the user interface. A user can also elect to schedule a reminder to follow up with the third party who received the user's contact information in an implementation of the present system.

The system may include plugin functionality for popular software programs and applications with contact information features, such as but not limited to Outlook, Gmail, other email programs, Zoom, Teams, Skype, VoIP systems, Venmo, Cash App, and other such programs or applications with contact information features. Such plugin functionality allows for seamless integration of the present system with programs and applications users already use and are familiar with.

The digital information management system may allow for aggregation of social media connections, interactions, posts, etc. across multiple platforms in a single interface. In certain implementations, the system user interface may include a page that lists the user's recent communications across integrated digital platforms in one place in chronological order or alternatively organized as the user desires. As an example, the user interface can show the user's most recent phone call, email, financial technology (FinTech) application transaction (such as but not limited to Venmo, Cash App, PayPal, Apple Pay, Google Pay, or blockchain transaction), Facebook message, Instagram message, and other digital communications in the same interface. This aggregation of digital communications allows a user to pick up conversations quickly and easily where they left off across multiple digital platforms. This aggregation of digital information across multiple platforms may be customizable as to the digital platforms integrated and the types or categories of digital information included.

The system may include a digital profile summary or snapshot for system users' integrated digital platform profiles. The digital profile summary or snapshot for a user accessible to another user may be limited to information shared with that other user via the system. A user can search and browse a summary or snapshot of postings, likes, photographs, etc. posted by each saved contact entry. This feature allows a user to quickly determine topics of mutual interest or topics to avoid prior to contacting another user.

The digital profile summary or snapshot also accommodates quicker review of a contact's postings than scrolling through each social media platform one by one.

The system may recognize non-saved, other users of the system when a user receives an email, text message, phone call, or any other form of communication from said non-saved, other user. This may facilitate efficient exchange of contact information. A user may scan a standard business card using a remote computing device camera, and the system may recognize and saves contact information included on the business card. The system may allow users to easily export contact information. The system may further include photographs, live or recorded video, preferred name information, name pronunciation information, gender, preferred pronouns, and/or other notes on each virtual contact card.

The digital information management system may include calendar functionality and accommodate integration of a user's calendars across multiple digital platforms in one place. The system may allow a user to customize sharing of particular appointment or meeting information with other users and the timeframe with which access to the user's calendar(s) is granted to other users (i.e., permanently or temporarily for a scheduled amount of time). The system may also allow a user to designate single appointments or entire calendars as private so that information contained therein would not be shared when the user shares calendar information with other users. The system may accommodate importing and syncing from various digital calendar platforms such that when any appointment or meeting is added or removed on any integrated calendar, such update will immediately sync to the calendar in the present system.

The system may allow for easy and efficient group scheduling with calendar sharing capabilities. A user can invite all the other users in a contact group or a single contact entry to share calendars in real time. Open days or times in a given day among all the sharing users may be highlighted, and any of the sharing users have the ability to send a new appointment or event to all of the other sharing users' calendars, which other sharing users then each have the option to accept and add to his or her calendar or deny. After finding a date and time that works for everyone for a particular appointment or event, users then have the option to continue to share their calendars with the group or terminate the sharing upon completion of the interaction. A user may share calendar information for a preset amount of time.

The system may further include photograph management and sharing functionality. For a photograph taken with, stored on, and/or accessible from a system user's integrated remote computing device, a user can easily share the photograph with an individual contact, with a group of contacts, on social media, and/or by any other type of digital message integrated with the present system.

The system may include image recognition functionality that identifies individuals within photographs. The system may automatically tag individual users identified in a photograph. The system may automatically send photographs to other members of an appropriate group of contacts and/or to each individual system user identified, or tagged, within each photograph. A user may customize settings of the system such that photographs taken for a period of time and/or at a particular location may be automatically shared with another contact or group of contacts.

The system may allow users to search and sort photographs by name of individual contacts tagged in the photograph. The system may save tagged photographs of a user in a folder accessible via the system user interface linked from a contact entry or virtual contact card for that user. When the system identifies a user within a photograph, the system may send a notification message to the identified user and prompts the user to accept or deny being tagged in the photograph. The system may be configured to automatically tag photographs with identified users, which tags can later be removed by the tagged user, as desired. Permissions for photograph sharing and tagging and access to tagged photographs of a user may be customizable using the user interface. Photographs may be manually tagged within the system. Additionally, photographs may be tagged with a contact group tag for sharing with all members of the corresponding contact group and allowing searching photographs by contact group.

The digital information management system may allow a user to selectively share his or her precise location securely with one or more other system users. A user may temporarily or permanently share location information with another system user; with individually selected, multiple system users; with all users within a system contact group; with all users within multiple selected contact groups; or combinations thereof. On/off digital toggle button(s) on the user interface may allow a user to control who receives the user's location information and when the information is shared. Other types of location sharing controls may be utilized.

The digital information management system may include a system messaging platform. Such system messaging may be accessible within the user interface and allow for text, image, video, emoji, and/or voice messaging.

The system may incorporate VoIP functionality. The system may aggregate multiple phone numbers into one system and allow a user to dynamically select which integrated phone number from which to call or send message(s). The user may customize system settings for what calls to take and what calls to ignore. For example, a user may designate that all calls, calls from unknown numbers, or calls from certain individuals or contact groups do not ring through and go straight to a voicemail system, either at all times or during specified periods. The system may further allow for users to set contingent voicemails for various timeframes or for calls from specific individuals or individuals within a certain contact group. Moreover, the system VoIP functionality may be customized to integrate with system calendar appointments or meetings and/or include selective busy and away settings when a user is doing something else via the user interface or has the user interface closed, respectively.

The system may include its own social media platform for selectively sharing photographs, videos, thoughts, and/or other digital information with other system users and/or system contact groups. The system may allow a user to confidentially remove another user from a particular group created by the user within the system social media platform or confidentially block a user for further posting in a particular thread. A user may scroll through connected threads within the system social media platform on the user interface or elect which connected threads the user wants to view. Users may selectively subscribe to common interest feeds such as news feeds, sports feeds, local weather feeds, hobby feeds, etc. Users subscribing to these various feeds may communicate with one another in a public forum setting via the system. The system may include functionality to identify other users with common interests within a certain geographic radius, facilitating introduction of likeminded individuals and/or those with interests in common in proximity to each other.

The system may include financial technology (FinTech) functionality to facilitate payments between system contacts within the same user interface. The FinTech features may integrate with a user's preferred bank account or credit card for transfers of funds. The FinTech may utilize blockchain currency for transfers of funds. The system may utilize its own blockchain currency which can then be converted into a local currency and transferred through the user interface, allowing for easy international monetary transactions and tourist payment options.

The system may include remote computing devices designed specifically to take advantage of the many features of the present digital information management system. Additionally, the system may include marketplace functionality which allows online vendors to market products to system users based on system activity, subscribed feeds, likes, location, etc. The system marketplace platform may allow users to list, sell, and buy items to and from other system users via the user interface.

FIG. 1 illustrates a digital information management system 100, according to an implementation. The digital information management system 100 may include computing devices such as a cloud-based data management system 102 and a user device 104. The cloud-based data management system 102 may include an application server 106, a database 108, and a data server 110. The user device 104 may include one or more computing devices associated with user profiles of the digital information management system 100, such as a smartphone 112 and/or a personal computer 114. The digital information management system 100 may include external resources such as an external application server 116 and/or an external database 118. The various elements of the digital information management system 100 may communicate via various communication links 120. An external resource may generally be considered a data resource owned and/or operated by an entity other than an entity that utilizes the cloud-based data management system 102 and/or the user device 104.

The digital information management system 100 may be web-based. The user device 104 may access the cloud-based data management system 102 via an online portal set up and/or managed by the application server 106. The digital information management system 100 may be implemented using a public internet. The digital information management system 100 may be implemented using a private intranet. Elements of the digital information management system 100, such as the database 108 and/or the data server 110, may be physically housed at a location remote from an entity that owns and/or operates the digital information management system 100. For example, various elements of the digital information management system 100 may be physically housed at a public service provider such as a web services provider. Elements of the digital information management system 100 may be physically housed at a private location, such as at a location occupied by the entity that owns and/or operates the digital information management system 100.

The communication links 120 may be direct or indirect. A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long-term evolution (LTE) standard, and so forth. "Indirect," when used regarding the communication links 120, may refer to any of the aforementioned indirect communication links.

Figure 2:
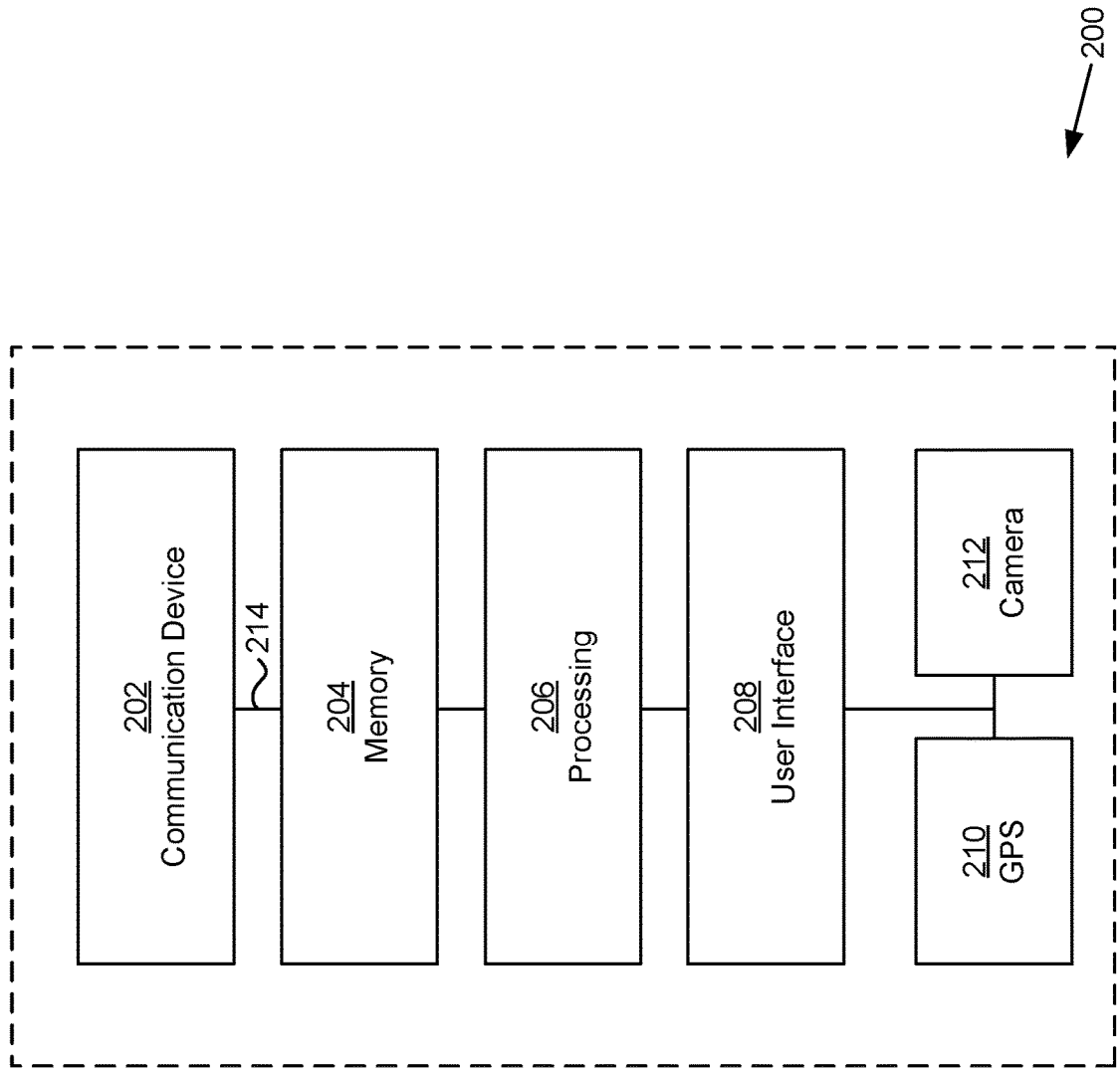
FIG. 2 illustrates a device schematic for various computing devices used in the digital information management system, according to an implementation.

FIG. 2 illustrates a device schematic for various computing devices used in the digital information management system 100, according to an implementation. A computing device 200 may include a communication device 202, a memory 204, a processor 206, a user interface 208, a global positioning system (GPS) 210, and a camera 212. Various hardware elements within the computing device 200 may be interconnected via a system bus 214. The system bus 214 may be and/or include a control bus, a data bus, and address bus, and so forth. The processor 206 may handle inputs received via the user interface 208. The processor 206 may cause data to be written and stored in the memory 204. The processor 206 may retrieve data stored in the memory 204 and output the data via the communication device 202.

The computing device 200 of the user device 104. The computing device 200 may be representative of the smartphone 112. The computing device 200 may be representative of the personal computer 114. The memory 204 may store application instructions, that, when executed by the processor 206, cause the computing device 200 and/or elements of the computing device 200 to execute various functions associated with the instructions, such as retrieving data, processing data, receiving input, processing input, transmitting data, etc.

As stated above, the computing device 200 may be representative of various devices of the digital information management system 100. Various elements of the digital information management system 100 may include data storage and/or processing capabilities. Such capabilities may be rendered by various electronics for processing and/or storing electronic signals. One or more of the devices in the digital information management system 100 may include a processor. For example, the cloud-based data management system 102, the user device 104, the smartphone 112, the personal computer 114, the external application server 116, and/or the external database 118 may include a processor. One or more of the devices in the digital information management system 100 may include a memory. For example, the cloud-based data management system 102, the user device 104, the smartphone 112, the personal computer 114, the external application server 116, and/or the external database 118 may include the memory.

The processor may have volatile and/or persistent memory. The memory may have volatile and/or persistent memory. The processor may have volatile memory and the memory may have persistent memory. Memory in the processor may be allocated dynamically. Such memory allocation may be based on instructions stored in the memory.

The processor may generate an output based on an input. For example, the processor may receive an electronic and/or digital signal. The processor may read the signal and perform one or more tasks with the signal, such as performing various functions with data in response to input received by the processor. The processor may read from the memory information to perform the functions. For example, the processor may update a variable from static to dynamic based on a received input and a rule stored as data on the memory. The processor may send an output signal to the memory, and the memory may store data according to the signal output by the processor.

The processor may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processor.

The memory may be and/or include a computer processing unit register, a cache memory, a magnetic disk, an optical disk, a solid-state drive, and so forth. The memory may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory.

Various devices in the digital information management system 100 may include data communication capabilities. Such capabilities may be rendered by various electronics for transmitting and/or receiving electronic and/or electromagnetic signals. One or more of the devices in the digital information management system 100 may include a communication device, e.g., the communication device 202. For example, the cloud-based data management system 102, the user device 104, the smartphone 112, the personal computer 114, the external application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processor, for communicating over a Wifi and/or cellular network. As used herein, "communication device" "communication component," and/or "communication unit" may be used generically herein to refer to any or all of the aforementioned elements and/or features of the communication component.

Various of the elements in the digital information management system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory and run by a processor. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Various of the devices in the digital information management system 100, including the computing device 200, may include a user interface for outputting information in a format perceptible by a user and receiving input from the user, e.g., the user interface 208. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the digital information management system 100 and/or various elements of the digital information management system described above. For example, inputs indicated as being received in a method may be input at the computing device 200. Determinations made in the methods may be outputs generated by the processor 206 based on inputs stored in the memory 204.

Figure 3:
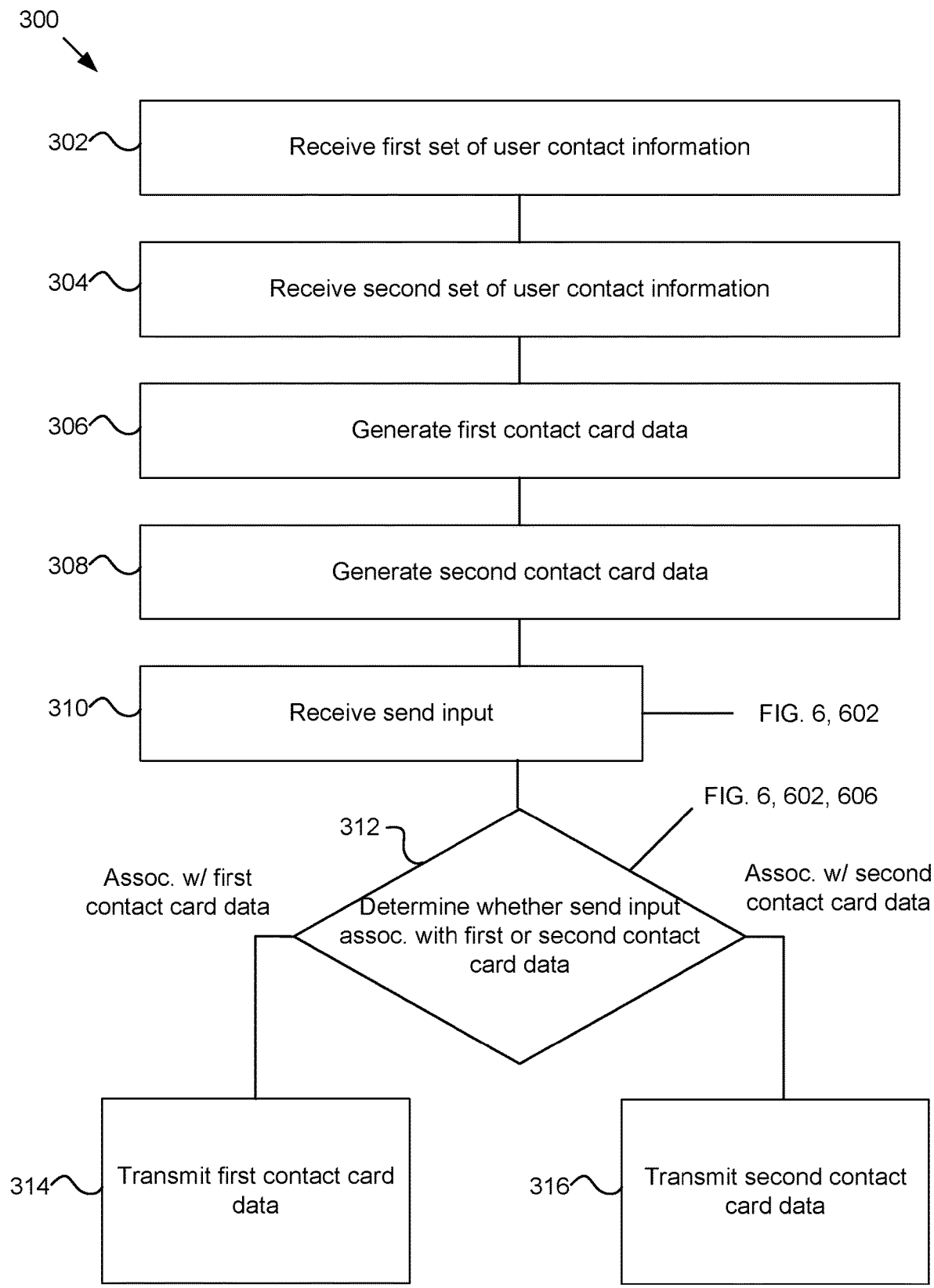
FIG. 3 illustrates a method of managing digital information, according to an implementation.

FIG. 3 illustrates a method 300 of managing digital information, according to an implementation. The method 300 may be implemented by a digital information management system such as the digital information management system 100. The system may include a communications network such as illustrated in FIG. 1 with communication links 120, a first computing device such as the cloud-based data management system 102 and/or the user device 104, and a second computing device such as the cloud-based data management system 102 and/or the user device 104. The first computing device may be remote from the second computing device, e.g., the first and second computing devices may be used by and/or associated with different users. In various implementations, the first and second computing devices may be in approximately the same location but may be considered "remote" because the devices are separate. In various implementations, the first and second computing devices may be in different locations.

The first computing device may include a first user interface, e.g., user interface 208, a first processor, e.g., processor 206, and a first memory coupled to the first processor, e.g., memory 204. The first memory may store instructions executable by the processor to connect to the communications network. The second computing device may include a second user interface, e.g., user interface 208, a second processor, e.g., processor 206, and a second memory coupled to the second processor, e.g., memory 204. The second memory may store instructions executable by the second processor to connect to the communications network.

The first and/or second memory may store instructions executable by the first and/or second processor to perform the functions of the method 300. The method 300 may include receiving a first set of user contact information having a first contact type designation (block 302). The first set of user contact information may include one or more of: a first phone number, a first email address, a first physical address, and a first social media handle. The first contact type designation may indicate a first type of contact group with which the first set of user contact information is to be shared. The method 300 may include receiving a second set of user contact information having a second contact type designation (block 304). The second set of user contact information may include one or more of: the first phone number or a second phone number, the first email address or a second email address, the first physical address or a second physical address, and the first social media handle or a second social media handle. The second contact type designation may indicate a second type of contact group with which the second set of user contact information is to be shared. The method 300 may include generating first contact card data that includes the first set of user contact information (block 306) and generating second contact card data that includes the second set of user contact information (block 308).

The method 300 may include receiving a send input via the second user interface (block 310) and, in response to receiving the send input, determining whether the send input is associated with the first contact card data or the second contact card data (block 312). In response to the send input being associated with the first contact card data, the first contact card data may be transmitted to the first computing device via the communications network (block 314). The first contact card data may be displayable by the first computing device via the first user interface. In response to the send input being associated with the second contact card data, the second contact card data may be transmitted to the first computing device via the communications network (block 316). The second contact card data may be displayable by the first computing device via the first user interface.

Figure 4:
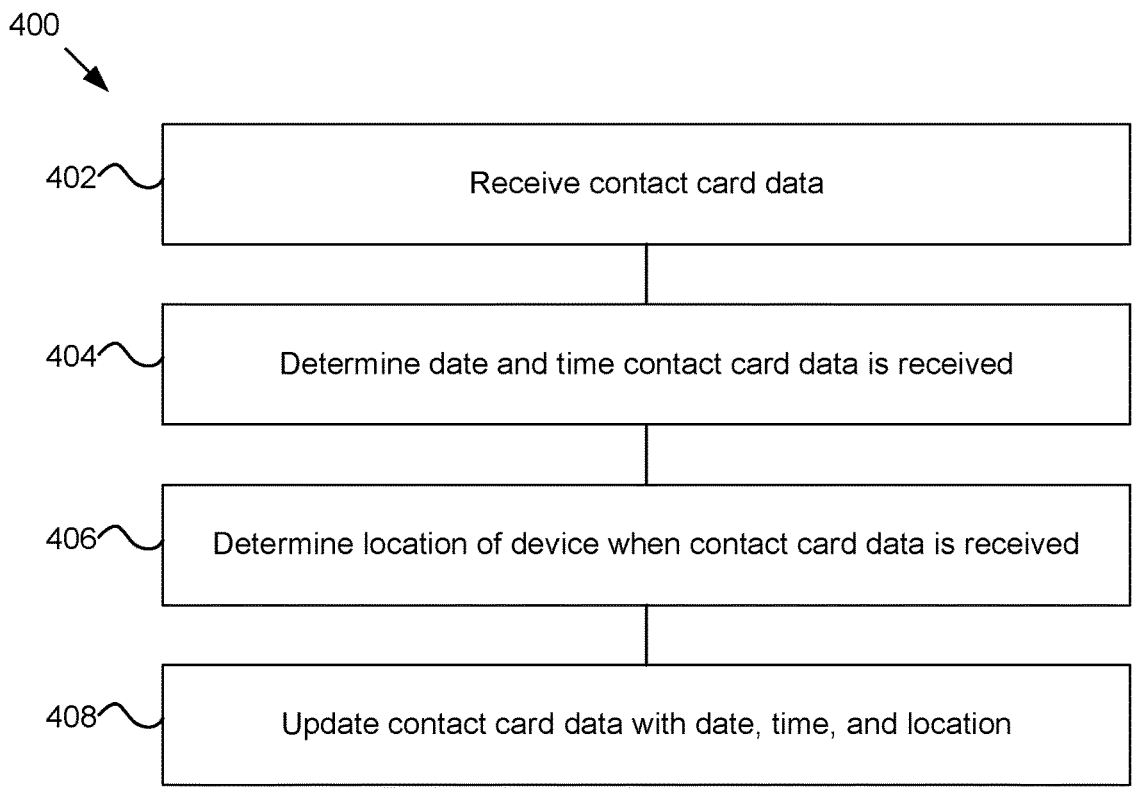
FIG. 4 illustrates a method of associating time, date, and location data with contact card data when a contact card is received from another computing device of the system, according to an implementation.

FIG. 4 illustrates a method 400 of associating time, date, and location data with contact card data when a contact card is received from another computing device of the system, such as according to the method 300. The computing device may include a GPS coupled to one or more of the processor and the memory, e.g., the GPS 210. The memory, e.g., memory 204, may store instructions executable by the processor, e.g., processor 206, to perform the functions of the method 400.

The method 400 may include receiving the first contact card data or the second contact card data (block 402), determining a date and time the first contact card data or the second contact card data is received (block 404), determining, by the GPS, a location of the computing device at the date and time the first contact card data or the second contact card data is received (block 406), and updating the first contact card data or the second contact card data with the date, time, and location (block 408).

Figure 5:
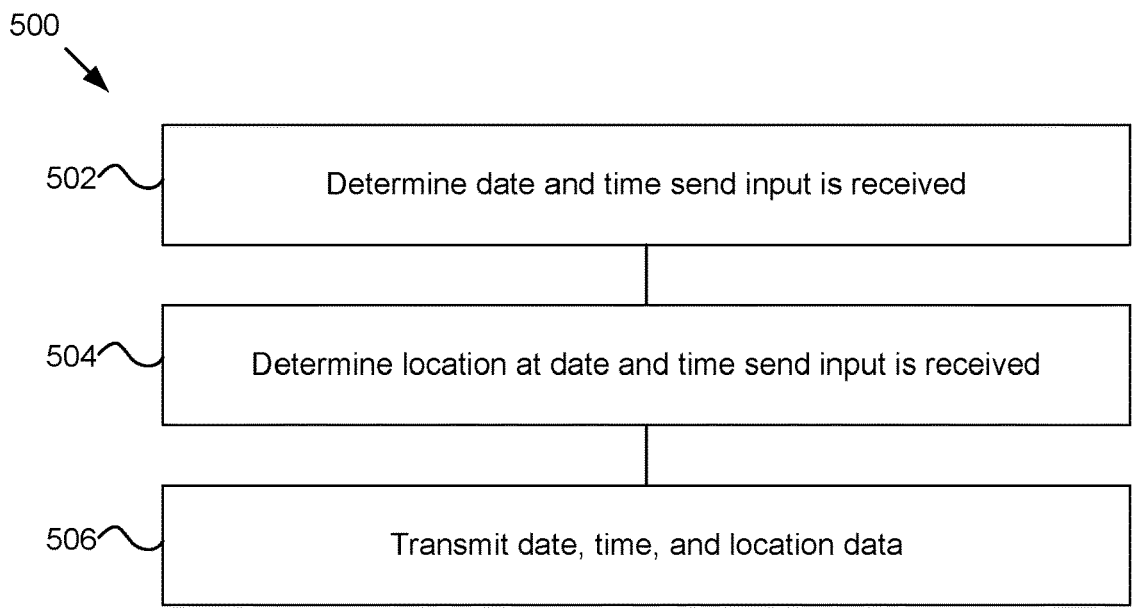
FIG. 5 illustrates a method of associating time, date, and location data with contact card data of a computing device sharing the contact card, according to an implementation.

FIG. 5 illustrates a method 500 of associating time, date, and location data with contact card data of a computing device sharing the contact card, such as according to the method 300. The computing device may include a GPS coupled to one or more of the processor and the memory, e.g., the GPS 210. The memory, e.g., memory 204, may store instructions executable by the processor, e.g., processor 206, to perform the functions of the method 500.

The method 500 may include in response to receiving a send input, determining a date and time the send input is received (block 502), determining, by the first GPS, a location of the computing device at the date and time the send input is received (block 504), and transmitting the date, time, and location to a remote computing device via the communications network (block 506).

Figure 6:
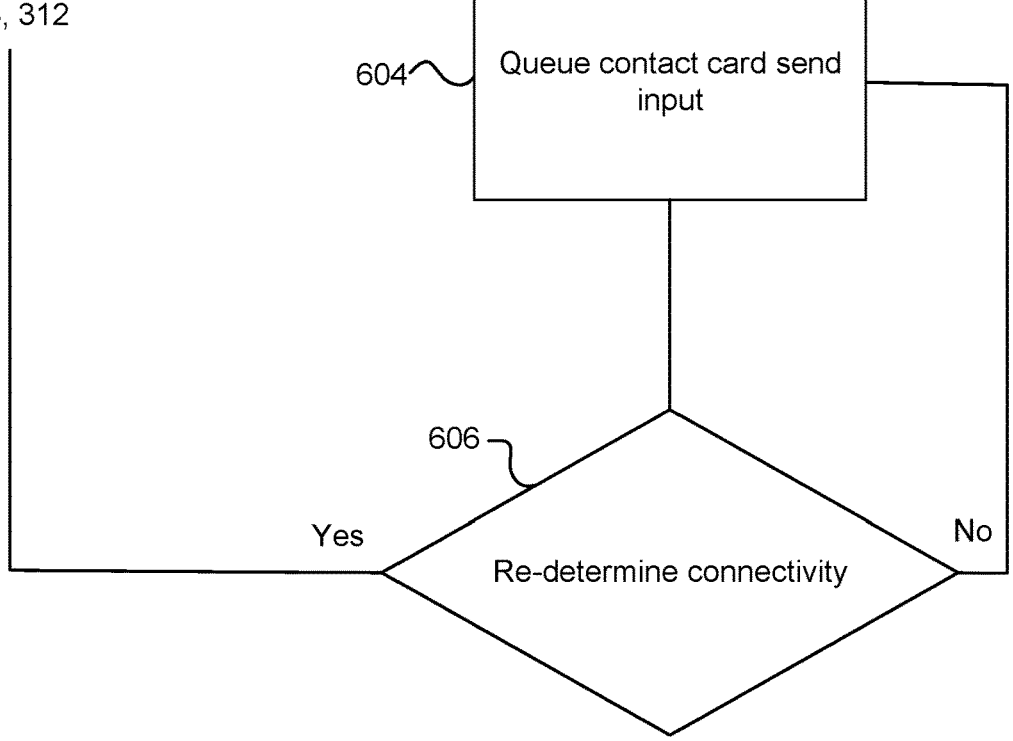
FIG. 6 illustrates a method of queueing contact card data when connectivity is limited, according to an implementation.

FIG. 6 illustrates a method 600 of queueing contact card data when connectivity is limited, such as when performing the functions of method 300. The method 600 may include determining a connectivity between the computing device and the communications network (block 602). In response to there being no connectivity, or in response to there being insufficient connectivity for transmitting the first or second contact card data, the date, the time, or the location, the method 600 may include adding the first or second contact card data, the date, the time, and the location to a queue in the memory (block 604) and periodically re-determining the connectivity until there is sufficient connectivity for transmitting the first or second contact card data, the date, the time, or the location (block 606).

Figure 7:
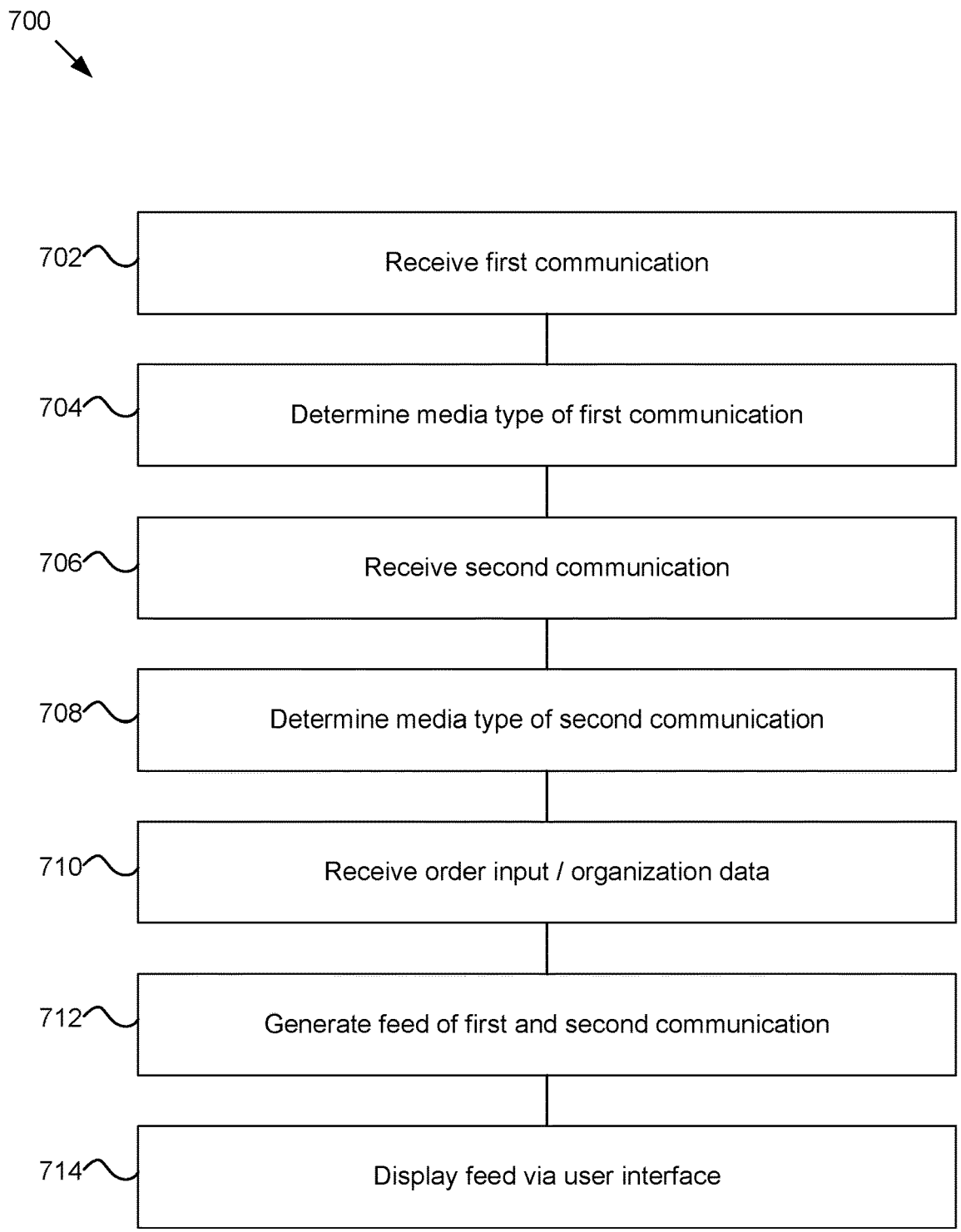
FIG. 7 illustrates a method of generating a feed of different types of communications that is displayed on a user interface, according to an implementation.

FIG. 7 illustrates a method 700 of generating a feed of different types of communications that is displayed on a user interface, e.g., the user interface 208. The communications may be associated with the contact information shared between different computing devices as described above regarding the method 300.

The method 700 may include receiving a first communication associated with the first set of contact information or the second set of contact information (block 702) and determining a media type of the first communication (block 704). The media type may include at least one of a phone call, an email, an instant message, or a social media post. The method 700 may include receiving a second communication associated with the first set of contact information or the second contact information (block 706) and determining the media type of the second communication (block 708). The media type of the second communication may be different from the media type of the first communication.

The method 700 may include receiving, via the user interface, an order input for the first communication and the second communication (block 710). The order input may be associated with organization data that indicates an order of organizing the first communication and the second communication. The method 700 may include generating a feed of the first communication and the second communication (block 712). The feed may indicate the media type of the first communication and the media type of the second communication. The first communication and the second communication may be organized in the feed according to the order input and organization data. The method 700 may include displaying the feed via the user interface (block 714).

Figure 8:
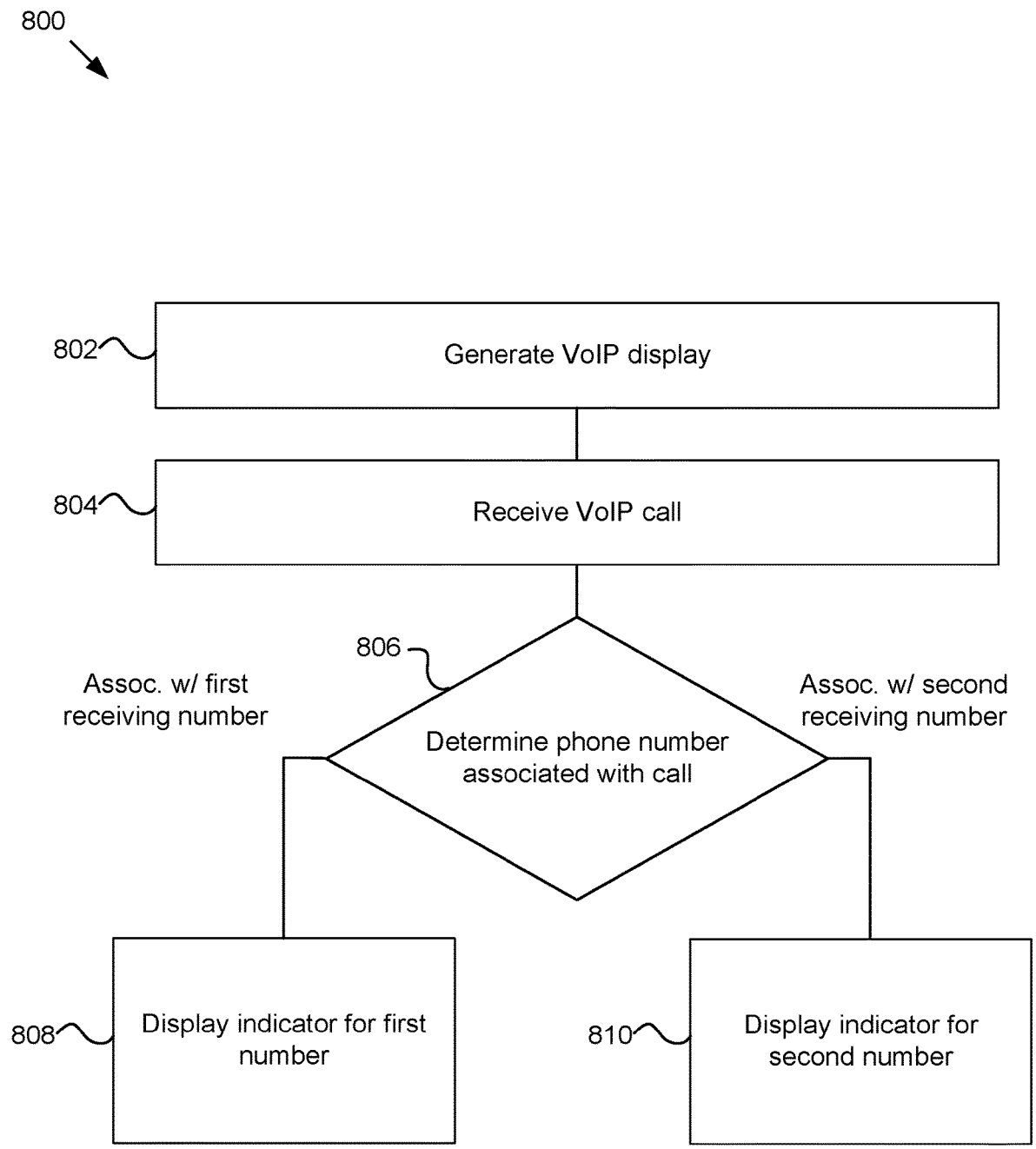
FIG. 8 illustrates a method of generating VoIP displays for different VoIP phone numbers stored and shared with other computing devices, according to an implementation.

FIG. 8 illustrates a method 800 of generating VoIP displays for different VoIP phone numbers stored and shared with other computing devices, such as described regarding method 300. The method 800 may include generating a voice over internet protocol (VoIP) display via the user interface (block 802), receiving a VoIP call via the communications network (804), and determining whether the VoIP call is associated with the first phone number or the second phone number (block 806). In response to the VoIP call being associated with the first phone number, the method 800 may include displaying, via the user interface, a first indicator associated with the first phone number (block 808). The first indicator may indicate the VoIP call is associated with the first set of contact information. In response to the VoIP call being associated with the second phone number, the method 800 may include displaying, via the user interface, a second indicator associated with the second phone number (block 810). The second indicator may indicate the VoIP call is associated with the second set of contact information.

Figure 9:
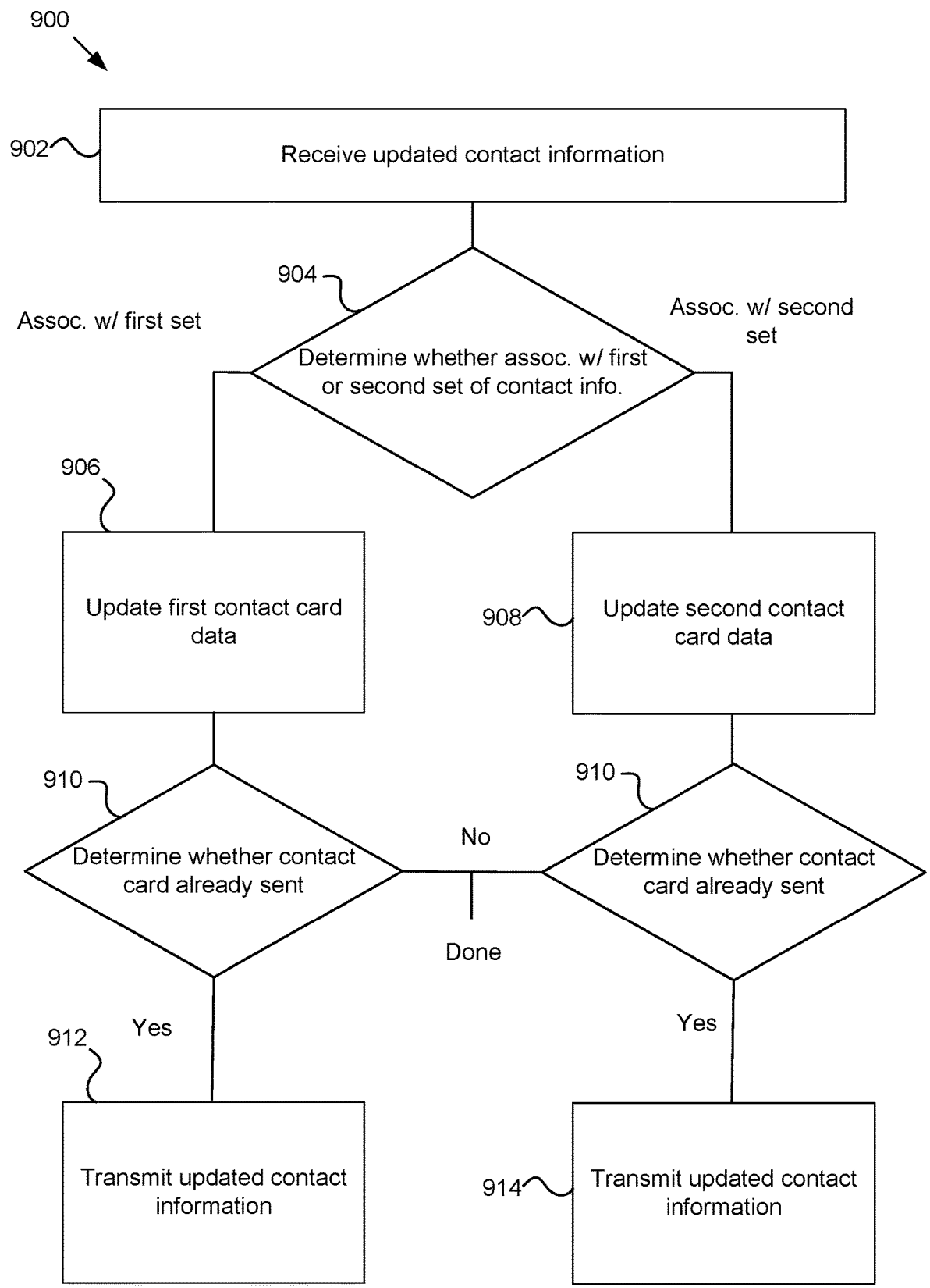
FIG. 9 illustrates a method of updating contact card data shared with another computing device, according to an implementation.

FIG. 9 illustrates a method 900 of updating contact card data shared with another computing device, such as is described regarding method 300. The method 900 may include receiving updated contact information (block 902) and determining whether the updated contact information is associated with the first set of contact information or second set of contact information (block 904). In response to the updated contact information being associated with the first set of contact information, the method 900 may include updating the first contact card data with the updated contact information (block 906). In response to the updated contact information being associated with the second set of contact information, the method 900 may include updating the second contact card data with the updated contact information (block 908).

The method 900 may include determining whether the first or second contact card data has already been transmitted to a remote computing device (block 910). In response to the updated contact information being associated with the first set of contact information and the first contact data being already transmitted to a remote computing device, the method 900 may include transmitting the updated contact information to the remote computing device (block 912). In response to the updated contact information being associated with the second set of contact information and the second set of contact information being already transmitted to the remote computing device, the method 900 may include transmitting the updated contact information to the remote computing device (block 914).

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processor, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely examples. Particular implementations may vary from these details and still be contemplated to be within the scope of the present implementations.

Related elements in the examples described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

I claim:

1. A digital information management system, comprising:
a communications network;
a first computing device comprising a first user interface, a first processor, a first memory coupled to the first processor, and a first global positioning system (GPS) coupled to one or more the first processor and the first memory, wherein the first memory stores first instructions executable by the processor to connect to the communications network; and
a second computing device comprising a second user interface, a second processor, a second memory coupled to the second processor, and a GPS coupled to one or more the second processor and the second memory, wherein the second memory stores second instructions executable by the processor to:
connect to the communications network;
receive a first set of user contact information having a first contact type designation, wherein: the first set of user contact information comprises one or more of: a first phone number, a first email address, a first physical address, and a first social media handle; and the first contact type designation indicates a first type of contact group with which the first set of user contact information is to be shared;
receive a second set of user contact information having a second contact type designation, wherein: the second set of user contact information comprises one or more of: the first phone number or a second phone number, the first email address or a second email address, the first physical address or a second physical address, and the first social media handle or a second social media handle; and the second contact type designation indicates a second type of contact group with which the second set of user contact information is to be shared;
generate first contact card data, wherein the first contact card data comprises the first set of user contact information;
generate second contact card data, wherein the second contact card data comprises the second set of user contact information;
receive a send input via the second user interface;
in response to receiving the send input, determine whether the send input is associated with the first contact card data or the second contact card data;
in response to the send input being associated with the first contact card data, transmit the first contact card data to the first computing device via the communications network, wherein the first contact card data is displayable by the first computing device via the first user interface; and
in response to the send input being associated with the second contact card data, transmit the second contact card data to the first computing device via the communications network, wherein the second contact card data is displayable by the first computing device via the first user interface;
in response to receiving the send input:
determine a date and time the send input is received;
determine, by the second GPS, a location of the second computing device at the date and time the send input is received;
determine a connectivity between the second computing device and the communications network;
in response to there being no connectivity, or in response to there being insufficient connectivity for transmitting the first or second contact card data, the date, the time, or the location of the second computing device, add the first or second contact card data, the date, the time, and the location of the second computing device to a queue in the second memory;
periodically re-determine the connectivity until there is sufficient connectivity for transmitting the first or second contact card data, the date, the time, or the location of the second computing device; and
in response to sufficient connectivity, transmit the date and time the send input is received, and location of the second computing device to the first computing device via the communications network.

2. The digital information management system of claim 1, wherein the first instructions are further executable by the first processor to:
receive the first contact card data or the second contact card data;
determine a date and time the first contact card data or the second contact card data is received;
determine, by the first GPS, a location of the first computing device at the date and time the first contact card data or the second contact card data is received; and
update the first contact card data or the second contact card data with the date, time, and location of the first computing device.

3. The digital information management system of claim 1, the first instructions further executable by the first processor to:
receive a first communication associated with the first set of contact information or the second set of contact information;
determine a media type of the first communication, wherein the media type comprises at least one of a phone call, an email, an instant message, or a social media post;
receive a second communication associated with the first set of contact information or the second contact information;
determine the media type of the second communication, wherein the media type of the second communication is different from the media type of the first communication;
receive, via the first user interface, an order input for the first communication and the second communication, wherein the order input indicates an order of organizing the first communication and the second communication;

generate a feed of the first communication and the second communication, wherein the feed indicates the media type of the first communication and the media type of the second communication, and wherein the first communication and the second communication are organized in the feed according to the order input; and display the feed via the first user interface.

4. The digital information management system of claim 1, the second instructions further executable by the second processor to:

generate a voice over internet protocol (VoIP) display via the second user interface; receive a VoIP call via the communications network;

determine whether the VoIP call is associated with the first phone number or the second phone number;

in response to the VoIP call being associated with the first phone number, display, via the second user interface, a first indicator associated with the first phone number, wherein the first indicator indicates the VoIP call is associated with the first set of contact information; and in response to the VoIP call being associated with the second phone number, display, via the second user interface, a second indicator associated with the second phone number, wherein the second indicator indicates the VoIP call is associated with the second set of contact information.

5. The digital information management system of claim 1, the second instructions further executable by the second processor to:

receive updated contact information;

determine whether the updated contact information is associated with the first set of contact information or second set of contact information;

in response to the updated contact information being associated with the first set of contact information, update the first contact card data with the updated contact information;

in response to the updated contact information being associated with the second set of contact information, update the second contact card data with the updated contact information; in response to the updated contact information being associated with the first set of contact information and the first contact data being already transmitted to the first computing device, transmit the updated contact information to the first computing device; and in response to the updated contact information being associated with the second set of contact information and the second set of contact information being already transmitted to the first computing device, transmit the updated contact information to the first computing device.

6. A method of managing digital information, comprising:

receiving, at a first computing device, a first set of user contact information having a first contact type designation, wherein:

the first set of user contact information comprises one or more of: a first phone number, a first email address, a first physical address, and a first social media handle; and the first contact type designation indicates a first type of contact group with which the first set of user contact information is to be shared;

receiving, at the first computing device, a second set of user contact information having a second contact type designation, wherein:

the second set of user contact information comprises one or more of: the first phone number or a second phone number, the first email address or a second email address, the first physical address or a second physical address, and the first social media handle or a second social media handle; and the second contact type designation indicates a second type of contact group with which the second set of user contact information is to be shared;

generating first contact card data, wherein the first contact card data comprises the first set of user contact information;

generating second contact card data, wherein the second contact card data comprises the second set of user contact information;

receiving a send input;

in response to receiving the send input, determining whether the send input is associated with the first contact card data or the second contact card data;

in response to the send input being associated with the first contact card data, transmitting the first contact card data to a second computing device via a communications network; and in response to the send input being associated with the second contact card data, transmitting the second contact card data to the second computing device via the communications network;

in response to receiving the send input:

determine a date and time the send input is received;

determine, by a first global positioning system (GPS) of the first computing device, a location of the first computing device at the date and time the send input is received;

determining a connectivity between the first computing device and the communications network;

in response to there being no connectivity, or in response to there being insufficient connectivity for transmitting the first or second contact card data, the date, the time, or the location of the first computing device, adding the first or second contact card data, the date, the time, and the location to a queue in a memory of the first computing device;

periodically re-determining the connectivity until there is sufficient connectivity for transmitting the first or second contact card data, the date, the time, or the location of the first computing device; and in response to sufficient connectivity, transmit the date, time, and location of the first computing device to the second computing device via the communications network.

7. The method of managing digital information of claim 6, further comprising:

receiving, at the second computing device, the first contact card data or the second contact card data;

determining a date and time the first contact card data or the second contact card data is received at the second computing device;

determining, by the second global positioning system (GPS) of the second computing device, a location of the second computing device at the date and time the first contact card data or the second contact card data is received; and updating the first contact card data or the second contact card data with the date, time, and location of the second computing device.

8. The method of managing digital information of claim 6, further comprising:
receiving a first communication associated with the first set of contact information or the second set of contact information;
determining a media type of the first communication, wherein the media type comprises at least one of a phone call, an email, an instant message, or a social media post;
receiving a second communication associated with the first set of contact information or the second contact information;
determining the media type of the second communication, wherein the media type of the second communication is different from the media type of the first communication;
receiving organization data for the first communication and the second communication, wherein the organization data indicates an order of organizing the first communication and the second communication; and
generating a feed of the first communication and the second communication, wherein the feed indicates the media type of the first communication and the media type of the second communication, and wherein the first communication and the second communication are organized in the feed according to the organization data.

9. The method of managing digital information of claim 6, further comprising:
generating a voice over internet protocol (VoIP) display via a user interface of the first computing device;
receiving a VoIP call via the communications network;
determining whether the VoIP call is associated with the first phone number or the second phone number;
in response to the VoIP call being associated with the first phone number, displaying, via the user interface, a first indicator associated with the first phone number, wherein the first indicator indicates the VoIP call is associated with the first set of contact information; and
in response to the VoIP call being associated with the second phone number, displaying, via the user interface, a second indicator associated with the second phone number, wherein the second indicator indicates the Vol P call is associated with the second set of contact information.

10. The method of managing digital information of claim 6, further comprising:
receiving updated contact information;
determining whether the updated contact information is associated with the first set of contact information or second set of contact information;
in response to the updated contact information being associated with the first set of contact information, updating the first contact card data with the updated contact information;
in response to the updated contact information being associated with the second set of contact information, updating the second contact card data with the updated contact information; in response to the updated contact information being associated with the first set of contact information and the first contact data being already transmitted to the second computing device, transmitting the updated contact information to the first computing device; and in response to the updated contact information being associated with the second set of contact information and the second set of contact information being already transmitted to the second computing device, transmitting the updated contact information to the first computing device.

11. A device for managing digital contact information, comprising:
a first user interface;
a processor; and
a first global positioning system (GPS) coupled to one or more of the processor and the memory;
a memory coupled to the processor, wherein the memory stores instructions executable by the processor to:
connect to a communications network;
receive a first set of user contact information having a first contact type designation, wherein: the first set of user contact information comprises one or more of: a first phone number, a first email address, a first physical address, and a first social media handle; and the first contact type designation indicates a first type of contact group with which the first set of user contact information is to be shared;
receive a second set of user contact information having a second contact type designation, wherein: the second set of user contact information comprises one or more of: the first phone number or a second phone number, the first email address or a second email address, the first physical address or a second physical address, and the first social media handle or a second social media handle; and the second contact type designation indicates a second type of contact group with which the second set of user contact information is to be shared;
generate first contact card data, wherein the first contact card data comprises the first set of user contact information; generate second contact card data, wherein the second contact card data comprises the second set of user contact information;
receive a send input via the user interface;
in response to receiving the send input, determine whether the send input is associated with the first contact card data or the second contact card data;
in response to the send input being associated with the first contact card data, transmit the first contact card data to a remote computing device via the communications network; and
in response to the send input being associated with the second contact card data, transmit the second contact card data to the remote computing device via the communications network;
in response to receiving the send input:
determine a date and a time the send input is received;
determine, by the first GPS, a location of the device at the date and the time the send input is received;
determine a connectivity with the communications network;
in response to there being no connectivity, or in response to there being insufficient connectivity for transmitting the first contact card data, the second contact card data, the date, the time, or the location of the device, add the first contact card data, the second contact card data, the date, the time, and the location of the device to a queue in the memory;
periodically re-determine the connectivity until there is sufficient connectivity for transmitting the first contact card data, the second contact card data, the date, the time, or the location of the device; and
in response to sufficient connectivity, transmit the date, the time, and the location of the device to the remote computing device via the communications network.

12. The device for managing digital contact information of claim 11, the memory further storing instructions executable by the processor to:
receive a first communication associated with the first set of contact information or the second set of contact information;
determine a media type of the first communication, wherein the media type comprises at least one of a phone call, an email, an instant message, or a social media post; receive a second communication associated with the first set of contact information or the second contact information;
determine the media type of the second communication, wherein the media type of the second communication is different from the media type of the first communication;
receive, via the user interface, an order input for the first communication and the second communication, wherein the order input indicates an order of organizing the first communication and the second communication;
generate a feed of the first communication and the second communication, wherein the feed indicates the media type of the first communication and the media type of the second communication, and wherein the first communication and the second communication are organized in the feed according to the order input; and
display the feed via the user interface.

13. The device for managing digital contact information of claim 11, the memory storing instructions executable by the processor to:
generate a voice over internet protocol (VoIP) display via the user interface;
receive a VoIP call via the communications network;
determine whether the VoIP call is associated with the first phone number or the second phone number;
in response to the VoIP call being associated with the first phone number, display, via the user interface, a first indicator associated with the first phone number, wherein the first indicator indicates the VoIP call is associated with the first set of contact information; and
in response to the VoIP call being associated with the second phone number, display, via the user interface, a second indicator associated with the second phone number, wherein the second indicator indicates the VoIP call is associated with the second set of contact information.

14. The device for managing digital contact information of claim 11, the memory storing instructions executable by the processor to:
receive updated contact information; determine whether the updated contact information is associated with the first set of contact information or second set of contact information;
in response to the updated contact information being associated with the first set of contact information, update the first contact card data with the updated contact information;
in response to the updated contact information being associated with the second set of contact information, update the second contact card data with the updated contact information;
in response to the updated contact information being associated with the first set of contact information and the first contact data being already transmitted to the first computing device, transmit the updated contact information to the first computing device; and
in response to the updated contact information being associated with the second set of contact information and the second set of contact information being already transmitted to the first computing device, transmit the updated contact information to the first computing device.

* * * * *